3,018,303
ORGANIC COMPOUNDS OF BORON, NITROGEN AND PHOSPHORUS
Gail H. Birum and James L. Dever, Dayton, Ohio, assignors to Monsanto Chemical Company, St. Louis, Mo., a corporation of Delaware
No Drawing. Filed July 22, 1959, Ser. No. 828,678
20 Claims. (Cl. 260—461)

The present invention relates to organic compounds containing boron, nitrogen, and phosphorus and more particularly relates to borazole compounds containing phosphorus ester substituents.

An object of this invention is to provide phosphinylhydrocarbyloxy borazole compounds.

A further object of this invention is to provide phosphinylhydrocarbyloxy borazole compounds which contain halogen atoms.

A further object of this invention is to provide phosphinylhydrocarbyloxy borazole compounds having halohydrocarbyloxy radicals.

A further object of this invention is to provide a method of preparing phosphinylhydrocarbyloxy borazole compounds.

Still another object is to provide hydrocarbon fuel compositions containing phosphinylhydrocarbyloxy borazole compounds.

Other objects of this invention will appear from the description hereinafter.

According to this invention we have found and prepared new compounds having the general formula.

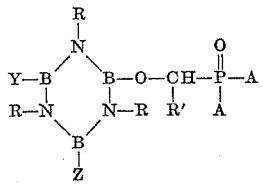

wherein R is selected from the group consisting of hydrogen, aryl, and alkyl radicals having from 1 to 10 carbon atoms, R' is selected from the group consisting of hydrogen, and hydrocarbyl radicals of from 1 to 12 carbon atoms, each A is selected from the group consisting of hydrocarbyl, hydrocarbyloxy, halohydrocarbyl, and halohydrocarbyloxy radicals which are free from aliphatic unsaturation and have from 1 to 12 carbon atoms, Y and Z are selected from the group consisting of bromine, chlorine, halohydrocarbyloxy radicals of from 1 to 12 carbon atoms and the phosphinylhydrocarbyloxy group,

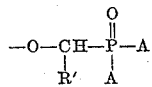

The preferred compounds of this invention are those having phosphinylhydrocarbyloxy radicals, i.e.,

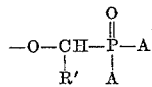

attached to each of the boron atoms of the borazole ring. However, the number of phosphinylhydrocarbyloxy radicals present in the compounds of this invention can be varied from one to three so that when there is present only one phosphinylhydrocarbyloxy radical there may be two halogen atoms or two halohydrocarbyloxy radicals linked to each of the two remaining boron atoms of the borazole compound. Likewise when two phosphinylhydrocarbyloxy radicals are linked to boron atoms of the borazole compound there may be one halogen atom or one halohydrocarbyloxy radical linked to the remaining boron atom. The generic formula for these compounds also includes those borazole compounds wherein there are attached to the boron atoms thereof a phosphinylhydrocarbyloxy radical, a halohydrocarbyloxy radical, and a halogen atom, respectively. The term "hydrocarbyl" as used in this case is defined in Degering, An Outline of Organic Chemistry, 5th edition (1947), page 135, as follows: "Hydrocarbyl is the radical obtained by the loss of a hydrogen atom from any hydrocarbon."

In preparing the phosphinylhydrocarbyloxy borazole compounds of this invention a trihaloborazole of the formula

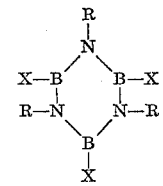

where R is as defined above, and X is selected from the group consisting of bromine and chlorine, is reacted with an aldehyde of the formula, R'CHO, where R' is as defined above, and a trivalent phosphorus ester of the formula

where T is selected from the group consisting of alkyl and haloalkyl radicals having from 1 to 12 carbon atoms, and A is as defined above, in sufficient quantity to replace one, two, or all three of the halogen atoms linked to the boron atoms of the borazole compound with phosphinylhydrocarbyloxy radicals, i.e.

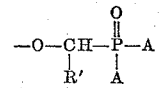

When only one or two of the halogen atoms have been so replaced, the products may be recovered as such or reacted further with an epoxy compound in sufficient quantity to replace one or both of the residual halogen atoms with halohydrocarbyloxy radicals. This order of procedure is not critical for it is also possible to treat the trihaloborazole reactant first with the epoxy compound to replace one or two halogen atoms with halohydrocarbyloxy radicals as above, and then to treat the resulting product with sufficient aldehyde and trivalent phosphorus ester to replace the remaining halogen atoms.

The number of phosphinylhydrocarbyloxy radicals present in the compounds of this invention depends upon the number of halogen atoms replaced, but will always be at least one. The number of halogen atoms replaced, in turn, depends upon the molar proportions of aldehyde and trivalent phosphorus ester that are used. Thus, when one mole each of trihaloborazole, aldehyde, and trivalent phosphorus ester are used, one halogen on the trihaloborazole is replaced. If two moles each of aldehyde and trivalent phosphorus ester are reacted with one mole of trihaloborazole, two halogens are replaced. When three moles each of aldehyde and trivalent phosphorus ester are used with one mole of trihaloborazole, all three halogens are replaced.

It is also within the scope of this invention to replace each halogen in the trihaloborazole with a different phosphinylhydrocarbyloxy radical by replacing the halogens, one at a time, as above, with a different aldehyde and trivalent phosphorus ester. Thus, by following the route indicated in the above paragraph for replacing one halogen atom by reacting one mole of aldehyde and one mole of trivalent phosphorus ester with one mole of trihaloborazole, and then adding one mole each of a different aldehyde and trivalent phosphorus ester for each halogen to be replaced, the reaction products can be varied extensively. For example, by reacting N,N',N''-tributyl-B,B',B''-trichloroborazole first with one mole each of acetaldehyde and triethyl phosphite until reaction is complete, then with one mole each of propionaldehyde and diethyl ethylphosphonite until reaction is complete, and finally with one mole each of butyraldehyde and ethyl diethylphosphinite, N,N',N''-tributyl-B-[1-(diethoxyphosphinyl)ethoxy] - B' - [1 - (ethoxyethylphosphinyl)propoxy]-B''-[1-(diethylphosphinyl)butoxy]-borazole can be produced. The structural formula for such compound is

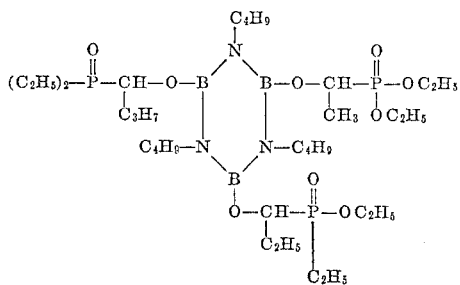

The R group attached to the nitrogen atoms of the haloborazole reactant may be all hydrogen, all aryl, all alkyl, or mixtures thereof. Examples of haloborazoles wherein R is all hydrogen are:

B,B',B''-trichloroborazole,
B,B',B''-tribromoborazole, and
B,B',B''-bromodichloroborazole.

Examples of haloborazole reactants where R is aryl are:

N,N',N''-triphenyl-B,B',B''-trichloroborazole,
N,N',N''-tritolyl-B,B',B''-tribromoborazole,
N,N',N''-trimesityl-B,B',B''-trichloroborazole,
N,N',N''-tris(α-naphthyl)-B,B',B''-bromodichloroborazole.

Among the haloborazole materials which can be used when the definition of R is alkyl are:

N,N',N''-triethyl-B,B',B''-trichloroborazole,
N,N',N''-tributyl-B,B',B''-tribromoborazole,
N,N',N''-trinonyl-B,B',B''-bromodichloroborazole,
N,N',N''-trihexyl-B,B',B''-chlorodibromoborazole,
N,N',N''-tributyl-B,B',B''-trichloroborazole.

Examples of haloborazole reactants where the R groups are mixed are:

N-butyl-N',N''-dihexyl-B,B',B''-trichloroborazole,
N,N'-diphenyl-B,B',B''-tribromoborazole,
N-phenyl-N',N''-dioctyl-B,B',B''-trichloroborazole,
N,N'-dipropyl-N''-decyl-B,B',B''-trichloroborazole,
N,N'-bis(-p-tolyl)-N''-phenyl-B,B',B''-tribromoborazole,
N,N'-diethyl-B,B',B''-bromodichloroborazole, and
N'-propyl-N''-phenyl-B,B',B''-trichloroborazole.

The aldehyde reactant can be formaldehyde, or can be any hydrocarbyl aldehyde. Examples of aldehydes which can be used where R' is alkyl are acetaldehyde, propionaldehyde, butyraldehyde, valeraldehyde, hexaldehyde, 2-ethylhexaldehyde, nonaldehyde, decaldehyde, etc. Among the aldehydes useful in this invention are those wherein R' has unsaturation such as undecenaldehyde, acrolein, methylacrolein, crotonaldehyde, cinnamaldehyde, etc. Aldehydes containing acetylenic unsaturation may also be used. Examples of such aldehydes are: 7-octynaldehyde, 2-propynaldehyde, 3-butynaldehyde, 8-decynaldehyde. Aldehydes having cyclic groups therein such as cyclohexylcarboxaldehyde, and 3-cyclohexenecarboxaldehyde, may also be used.

Examples of aromatic aldehydes which can be used are benzaldehyde, o-, m-, or p-tolualdehyde, 2,3-, 2,4-, 2,5-, or 2,6- dimethylbenzaldehyde, mesitaldehyde, α- or β-naphthaledehyde, phenacetaldehyde, etc.

The trivalent phosphorus esters useful as reactants in this invention are either simple or mixed phosphite, phosphonite, and phosphinite compounds having at least one alkoxy or haloalkoxy radical containing from 1 to 12 carbon atoms, the remaining valences being satisfied by hydrocarbyl, hydrocarbyloxy, halohydrocarbyl or halohydrocarbyloxy radicals having from 1 to 12 carbon atoms. Examples of phosphite compounds that can be used are the trialkyl phosphites such as triethyl, tributyl, trihexyl, tris(2-ethylhexyl), trioctyl, tridodecyl, ethyl dipropyl, or heptyl dibutyl phosphite; the alkyl diaryl phosphites such as ethyl diphenyl, butyl diphenyl, methyl bis-(p-tolyl), or nonyl bis(2,4-xylyl) phosphite; and the dialkyl aryl phosphites such as diethyl phenyl, methyl propyl cumyl, or bis(2-ethylhexyl) α-naphthyl phosphite, and their halogen substitution products such as tris(2-chloropropyl), tris(bromoheptyl), tris(2-fluoroethyl), and 4,4-dichlorobutyl bis(2-chlorophenyl) phosphite. The phosphonite and phosphinite compounds usable as reactants in this invention are those having definitions of the T and A groups the same as in the phosphite compounds. Examples of phosphonite compounds that can be used are: diethyl ethylphosphonite, bis(2-chloropropyl) butylphosphonite, 6-chlorohexyl 2-chlorophenyl 2-chlorophenylphosphonite, diundecyl phenylphosphonite, 2-ethyldecyl phenyl p-tolylphosphonite, and 2-chloroethyl butyl mesitylphosphonite. Examples of phosphinite compounds that can be used are: methyl dimethylphosphinite, 2-chloroethyl bis(2-chloroethyl)phosphinite, hexyl diphenylphosphinite, 2-ethylhexyl bis(2,4,6-trichlorophenyl) phosphinite, nonyl didecylphosphinite, and 8-chlorooctyl bis(α-naphthyl)phosphinite.

Examples of products obtained by reacting one mole of trihaloborazole, one mole of aldehyde, and one mole of trivalent phosphorus ester to replace one halogen atom in the borazole reactant are: N,N',N''-tributyl-B,B'-dichloro - B'' - [1 - diethoxyphosphinyl)propoxy]borazole, made by reacting one mole each of N,N',N''-tributyl-B,B',B''-trichloroborazole, propionaldehyde, and triethyl phosphite; N,N',N'' - triphenyl-B,B'-dibromo-B''-[α-(ethoxyphenylphosphinyl)benzyloxy]-borazole made by reacting one mole each of N,N',N''-triphenyl-B,B',B''-tribromoborazole, benzaldehyde, and diethyl phenylphosphonite; and B,B'-dichloro-B''-[1-(diethylphosphinyl)2-ethylhexyloxy]borazole made by reacting one mole each of B,B',B''-trichloroborazole, ethyl diethylphosphinite, and 2-ethylhexaldehyde.

Examples of products obtained by reacting one mole of a trihaloborazole, and two moles each of aldehyde and trivalent phosphorus ester to replace two halogens in the trihaloborazole reactant are: N,N',N''-triethyl-B-chloro-B',B'' - bis[1 - (dipropoxyphosphinyl)-butoxy]borazole made by reacting one mole of a trichloroborazole, and two mole each of butyraldehyde and tripropyl phosphite; N,N',N'' - tri-p-tolyl-B-bromo-B',B''-bis(1-[bis(2-chloroethoxy)phosphinyl]octyloxy)borazole made by reacting one mole of N,N',N''-tri-p-tolyl-B,B',B''-trichloroborazole and two moles each of n-octaldehyde, and tris(2 - chloroethyl) phosphite; N,N',N''-triamyl-B-chloro-B',B'' - bis[1-(butoxybutylphosphinyl)propoxy]borazole made by reacting one mole of N,N',N''-triamyl-B,B',B''-trichloroborazole, and two moles each of propionaldehyde, and dibutyl butylphosphonite; B-bromo-B',B''-bis-[1-(diphenylphosphinyl)heptyloxy]borazole made by reacting one mole of B,B',-B''-tribromoborazole, and two moles each of heptaldehyde, and ethyl diphenylphosphinite.

When one mole of N,N',N''-trialkyl-B,B',B''-trihaloborazole is treated with three moles each of aldehyde and trivalent phosphorus ester, all three halogens of the borazole compounds are replaced by phosphinylhydrocarbyloxy groups. Examples of such compounds are: N,N',-N" - tributyl-B,B',B"-tris[1-(diethoxyphosphinyl)propoxy]borazole made by reacting one mole of N,N',N"-tributyl-B,B',B"-trichloroborazole with three moles each of triethyl phosphite, and propionaldehyde; N,N',N"-tris(2-chlorophenyl) - B,B',B"-tris[1-(dodecyloxydodecylphosphinyl)ethoxy]borazole made by reacting one mole of N,N',N" - tris(2-chlorophenyl)B,B',B"-trichloroborazole with three moles each of acetaldehyde and didodecyl dodecylphosphonite; B,B',B"-tris[1-(dihexylphosphinyl)-methoxy]borazole made by reacting one mole of B,B',B"-trichloroborazole with three moles each of formaldehyde and hexyl dihexylphosphinite.

As above indicated, it is possible to prepare phosphinylhydrocarbyloxy derivatives of borazole compounds in which a different phosphinylhydrocarbyloxy group is attached to each boron atom of the borazole. Examples of such compounds are:

N,N',N" - trimethyl-B-[α-(dipropoxyphosphinyl)benzyloxy] - B' - {1-[bis(2-ethylhexyloxy)phosphinyl]—2-propenyloxy}-B"-[1-(diphenoxyphosphinyl)ethoxy]borazole, N,N',N" - tributyl - B-[1-(diethoxyphosphinyl)propoxy] - B'-[1-propoxypropylphosphinyl)butoxy]-B"-[1-(dihexylphosphinyl)ethoxy]borazole, N,N',N"-tris(α-naphthyl)-B - {1 - [bis(2 - chloropropoxy)phosphinyl]propoxy} - B' - [1 - (dipentyloxyphosphinyl)ethoxy]-B"-[1 - (methoxymethylphosphinyl)methoxy]borazole, B-[α-(didecylphosphinyl) - p - methylbenzyloxy]-B'-[1-butoxybutylphosphinyl)amyloxy]-B"-[1 - (diethoxyphosphinyl)-4-hexenyloxy]borazole, and N,N',N"-triethyl-B,B'-bis[1 - (ethoxyphenylphosphinyl)propoxy] - B"-[1 - (diethoxyphosphinyl)ethoxy]borazole.

The phosphinylhydrocarbyloxy borazole compounds having one or two halogen atoms attached to the boron atoms of the borazole ring can be recovered as such or used as intermediates to prepare the phosphinylhydrocarbyloxy halohydrocarbyloxyborazole compounds by treating them with an epoxy compound having from 2 to 12 carbon atoms. For example, the halogen atoms on N,N',N"-tributyl-B,B'-dichloro-B"-[1-(diethoxyphosphinyl)propoxy]borazole can be treated with an epoxy compound such as 1,2-epoxypentane to recover N,N',N"-tributyl-B,B'-bis(2-chloropentyloxy) - B" - [1 - diethoxyphosphinyl)propoxy]borazole. Similarly, N,N'N"-triethyl-B-chloro-B',B" - bis[1 - (dipropoxyphosphinyl)butoxy]borazole will react with one mole of 2-chloro-3,4-epoxybutane according to the following reaction:

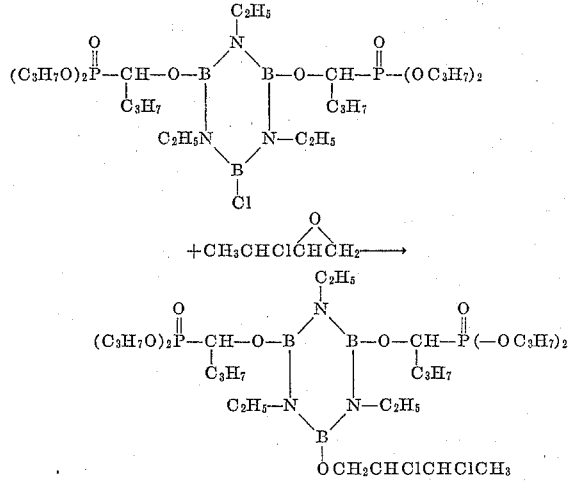

thus producing N,N',N"-triethyl-B-(2,3-dichlorobutoxy)-B',B"-bis[1-(dipropoxyphosphinyl)butoxy]borazole.

Some examples of epoxide and oxirane compounds that are suitable for reacting with the halogen atoms on the phosphinylhydrocarbyloxy borazole compounds of this invention are, e.g., ethylene oxide and alkyl derivatives thereof such as propylene oxide, isobutylene oxide, 1,2-epoxybutane, 2,3-epoxybutane, 1,2-epoxypentane, 2,3-epoxypentane, 2,3-epoxyhexane, 1,2-epoxyhexane, 1,2-epoxyheptane, 2,3-epoxy-3-ethylpentane, 1,2-epoxy-4-methylpentane, 1,2-epoxy-2-ethylhexane, 1,2-epoxy,2,4,4-trimethylpentane, 1,2-epoxy-2,3-dimethylheptane; haloalkyl substituted oxiranes such as epichlorohydrin, epibromohydrin, epiiodohydrin, epifluorohydrin, 1,2-epoxy-4-bromobutane, 2,3-epoxy-4-chlorobutane, 1,2-epoxy-3,4-dibromobutane, 2,3-epoxy-1-bromopentane, 3,4-epoxy-2-chlorohexane, 1,2-epoxy-3,3,3-trifluoropropane; the alkenyl-substituted oxiranes such as 3,4-epoxy-4-methyl-1-pentene, 1,2-epoxy-3-butene and 3,4-epoxy-1-butene; aryl substituted oxiranes such (epoxyethyl)benzene, (1,2-epoxy-1-methylethyl)benzene, (3-chloro-1,2 - epoxypropyl)benzene; alkoxyalkyl- and phenoxyalkyl-substituted oxiranes such as methyl, ethyl, isopropyl, isoamyl, phenyl ethers of glycidol, i.e., compounds of the formula

where R is methyl, ethyl, isopropyl, amyl, or phenyl; (2-ethoxyethyl)-ethylene oxide, etc.

A few examples of products prepared by reacting phosphinylhydrocarbyloxy borazole compounds containing halogen atoms attached to one or two of the boron atoms theerof are, e.g., N,N',N"-triphenyl-B,B'-bis(2-bromohexyloxy) - B"-[α-(ethoxyphenylphosphinyl)benzyloxy]borazole, B,B'-bis(2-chloro-2,3-dimethylheptyloxy) - B"-[1-(diethoxyphosphinyl)-2-ethylhexyloxy]borazole, N,N',N"-trihexyl-B,B'-bis(2 - chloro - 1 - methylethylphenoxy)-B"-[1 - (dimethoxyphosphinyl)propoxy]borazole, N,N',N"-tris(p-tolyl)-B-(2-chloro-2-ethyl - 1 - methylbutoxy)-B',B"-bis[1 - (propoxyphenylphosphinyl)ethoxy]borazole, and N,N',N"-tris(p-tolyl - B - (2-chloro-1,1-diethylpropoxy)—B',B"—bis[1 - (propoxyphenylphosphinyl)ethoxy]borazole and mixtures of the two when 2,3-epoxy-3-ethylpentane is used, N,N',N"-triethyl-B-(2-chloro-3,3,3 - trifluoropropoxy)-B',B"-bis[1-(dipropoxyphosphinyl)butoxy]borazole.

Reaction of the trihaloborazole compound, the aldehyde, and the trivalent phosphorus ester takes place readily by mixing together the three reactants at ordinary, decreased, or increased temperatures and allowing the resulting reaction mixture to stand until formation of the desired phosphinylhydrocarbyloxy borazole compound. Generally temperatures on the order of −50° to 125° C. are used with temperature of −25° C. to 50° C. being preferred. In a continuous process, one of the three reactants, preferably, the haloborazole compound is added to the mixture of the aldehyde and the trivalent phosphorus ester. Because the reaction is generally exothermic, gradual contact of the reactants is usually recommended. However, as will be apparent to those skilled in the art, the exothermal nature of the reaction becomes less of a factor as the molecular weight of the reactants, and particularly of the trivalent phosphorus ester, is increased. When the aldehyde used is either a higher alkanecarboxaldehyde or an aralkyl or alkaryl aldehyde, reaction is generally not so rapid as it is with the lower aliphatic aldehydes or with benzaldehyde. It is thus recommended that in each initial run, the three reactants be mixed gradually at low temperatures and that external heating be employed only when there appears no spontaneous increase in temperature as a consequence of the mixing. In most instances, the reaction is mildly exothermic initially. Whether the reaction goes to completion without the use of extraneous heat is determined by the nature of the reactants. Completion of the reaction, in any event, can be readily ascertained by noting cessation in change of viscosity, refractive index, or the quantity of by-product alkyl or haloalkyl halide. Using the lower alkanecarboxaldehydes, optimum conditions comprise gradual addition of the trihaloborazole compound to a mixture of the other two reactants with application of external cooling and thorough stirring. Usually it suffices to maintain the reaction temperature at, say, from minus 25° to plus 50° C. during addition of the reactants. When all three of the reactants have been added to said mixture and there is no longer any evidence of exothermic reaction, completion of the reaction may be assured by heating the reaction mixture to a temperature of from 50° C. to 150° C. With the more sluggish aldehydes, it may be necessary to heat the reaction mixture moderately before an exothermic reaction is initiated. Employing a high molecular weight phosphorus ester and a high molecular weight aldehyde, even higher temperatures may be required.

The reactants are advantageously employed in stoichiometric proportions, i.e., one mole of trihaloborazole compound and substantially one mole each of the aldehyde and of the trivalent phosphorus ester per halogen atom to be replaced in said trihaloborazole compound, in that good yields of the desired product result and there arises substantially no problem of separating any excess reactant or reactants. However, the aldehyde and phosphorus ester may be present in excess with respect to said boron halogen compound.

Whenever it is desired to limit the reaction to the displacement of only one or two of the halogen atoms on the trihaloborazole used, it is preferred to operate at the lower temperatures, say, minus 25° to 0° C., and to add the aldehyde and trivalent phosphorus ester to the trihaloborazole, and when this reaction is completed an oxirane compound can be reacted with the remaining halogen atoms if halohydrocarbyloxy radicals are desired. However, when the displacement of halogen from the trihaloborazole is to be complete, i.e., where all three of the halogen atoms are to be replaced by phosphinylhydrocarbyloxy radicals, no special order of mixing the reactants need to be observed. The trihaloborazole compound may be added to a mixture of the aldehyde and trivalent phosphorus ester. The reaction may also be carried out by mixing the trihaloborazole compound with the aldehyde at a low temperature, and then adding the phosphorus ester. Similarly, the process can be carried out by mixing the trihaloborazole compound and the trivalent phosphorus ester at a low temperature and then adding the aldehyde.

Formation of the desired product, i.e., the phosphinylhydrocarbyloxy borazole compound, is accompanied by the formation of a halogenated alkane as a by-product. Thus, the reaction of, say, N,N',N''-tributyl-B,B',B''-trichloroborazole, with three moles each of acetaldehyde and triethyl phosphite gives ethyl chloride as by-product:

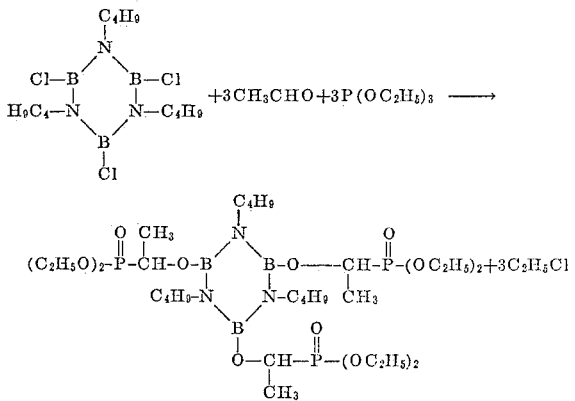

The by-product halogenated alkane thus consists of one of the alkyl or haloalkyl radicals from the trivalent phosphorus ester used plus a halogen atom from the initially employed haloborazole. This by-product is readily removed from the desired product by volatilization. The by-product halogenated alkanes are generally articles of commerce for which many applications exist. Also, for many purposes a solution of the phosphinylhydrocarbyloxy borazole compound in the haloalkane may be used directly for a variety of industrial and agricultural applications, e.g., as a gasoline additive or a nematocide.

The epoxy compounds react with the haloborazole compound with comparative ease, and particularly well with the phosphinylhydrocarbyloxy haloborazole compounds by mixing the reactants at ordinary, decreased, or elevated temperatures. Generally from 0° C. to 125° C. are used, with from 0° C. to 80° C. being preferred. The higher temperatures are used primarily to promote reaction of the materials of higher molecular weight. The reaction is usually mildly exothermic, particularly so with the lower molecular weight reactants. In such cases it is sometimes desirable to cool and stir the reaction mixture to control the speed and the extent of reaction. The mixture is then usually heated to a higher temperature of the order of 80 to 130° C. to insure complete reaction, but such heating is not necessary where it is evident by well known chemical means that the reaction is complete.

The epoxy reactant is usually added to the haloborazole reactant in stoichiometric quantities, particularly so when it is desired to convert only one or two of three available halogen atoms to halohydrocarbyloxy radicals. However, a slight excess (on the order of up to 10%) of oxirane compound may be used when it is no longer necessary to control the number of halogen atoms converted to halohydrocarbyloxy radicals.

The process of the present invention is readily conducted in the absence of an inert diluent or catalyst. However, catalysts and diluents or solvents may be employed. The use of diluents may be particularly advantageous when working with the highly active aldehydes; such diluents may be, e.g., benzene, toluene, methylene chloride, or hexane.

The compounds of the present invention are stable, usually high boiling materials which range from viscid liquids to waxy or crystalline solids. They are advantageously used as biological toxicants, e.g., as insecticides, fungicides, nematocides, and bacteriostats; as hydrocarbon oil lubricant and gasoline additives; as functional fluids, e.g., in force-transmission media and dielectric applications; as plasticizers for synthetic resins and plastics; as rubber-compounding chemicals; and as flame-proofing agents for cellulosic and carbonaceous combustible materials in general, e.g., surface coatings, laquers, polymers, resins, and adhesives.

Those of the presently provided phosphinylhydrocarbyloxy borazole compounds which are gasoline-soluble are particularly useful as preignition additives for leaded gasolines. The invention thus provides an improved fuel for spark ignition internal combustion engines which consists essentially of gasoline, an organolead anti-knock compound, and a gasoline soluble phosphinylhydrocarbyloxy borazole ester, said ester being present in said fuel in a quantity sufficient to suppress preignition of the fuel and sparkplug fouling.

Preignition is the ignition of the combustible mixture of air and fuel prior to firing by the sparkplug. This occurs when deposits of readily glowing material build up in the combustion chamber. When the fuel is a gasoline containing an organolead anti-knock compound together with a halohydrocarbon scavenger, such readily glowing deposits comprise carbon in a mixture with lead halides, the latter acting to reduce the normal ignition temperature of carbon. Since reduction of the ingition temperature tends to increase with increasing concentration of the organolead anti-knock compound, preignition is a problem which becomes particularly troublesome as use of high compression engines becomes more prevalent. The deposits of carbon and lead salt retain sufficient heat from the previous firing cycle in sufficient quantity to permit them to glow, and if the glowing period (which depends upon ease of ignition, and hence the lead content of the deposit) is long enough, the fuel is fired in the next cycle before it can be fired by the spark plug. The erratic firing which thus results is demonstrated by a "wild ping" or dull thudding knock. It is generally accompanied by increased detonation, spark plug fouling, and reduction of exhaust valve life.

It has now been found that preignition and the various difficulties consequent thereto can be substantially suppressed or entirely eliminated by incorporating into the leaded gasoline a phosphinylhydrocarbyloxy borazole compound which is soluble in the gasoline in a preignition inhibiting quantity. Such a quantity will depend, of course, upon the quantity of organolead compound and halohydrocarbon scavenger in the fuel. Leaded gasolines usually contain an anti-knocking quantity of an organolead compound such as tetraethyllead tetramethyllead, dimethyldiethyllead, and tetraphenyllead and substantially the amount of hydrocarbon halide scavenger, say, ethylene dibromide, ethylene dichloride, acetylene tetrabromide, or mono- or polyhalopropane, butane, or pentane, or polyhaloalkylbenzene, which is calculated to react with the organolead compound to give a lead halide, e.g., lead bromide when the organolead compound is tetraethyllead and the halohydrocarbon is ethylene dibromide. The quantity of the present phosphinylhydrocarbyloxy borazole compound which will suppress preignition of the leaded hydrocarbon fuel will depend upon the quantity of lead present in the fuel and will vary from, say, 0.05 to 10.0 moles of said ester per mole of lead present in said fuel.

*Example 1*

A 500 ml. flask equipped with a thermometer, stirrer, condenser, and dropping funnel was charged with 7.0 g. (0.12 mole) of propionaldehyde and 20 g. (0.12 mole) of triethyl phosphite. Then 14.1 g. (0.04 mole) of B,B′,B″-trichloro-N,N′,N″-tributylborazole was added dropwise over a 15 minute period while controlling the temperature of the reaction mixture between 19–32° C. with an ice bath when necessary. After washing residual borazole from the dropping flask into the reaction flask with methylene chloride, the reaction mixture was heated to 75° C. to insure complete reaction. After allowing the reaction mixture to cool to room temperature, it was placed under vacuum and heated to 45° C. to remove the methylene chloride and byproduct ethyl chloride. The residue was concentrated to 104° C./0.25 mm. to obtain an essentially quantitative yield of N,N′,N″-tributyl - B,B′,B″-tris[1-(diethoxyphosphinyl)propoxy]borazole.

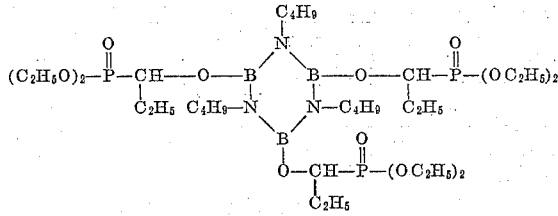

*Example 2*

To a 500 ml. flask equipped as in Example 1 was charged 27.8 g. (0.079 mole) of B,B′,B″-trichloro-N,N′,N″-tributylborazole, and then 79.2 g. (0.236 mole) of trihexyl phosphite. Propionaldehyde, 13.8 g. (0.236 mole) was added dropwise in 0.2 hour, keeping the temperature of the reaction mixture between 30°–45° C. with cooling when necessary. When the addition of propionaldehyde was completed, the reaction mixture was heated to 87° C. to insure complete reaction. The mixture was then placed under vacuum to remove byproduct, hexyl chloride, which was collected in a Dry Ice trap. The residue was concentrated to 168° C./0.13 mm. with no distillate coming over. The crude product, a pale yellow liquid was essentially pure N,N′,N″-tributyl-B,B′B″-tris[1-(dihexyloxyphosphinyl)propoxy]borazole.

*Example 3*

To a mixture of 18.5 g. of B,B′,B″-trichloro-N,N′,N″-tributylborazole and 20.3 g. of 2-ethylhexaldehyde in a 500 ml. flask equipped as in Example 1, was added dropwise in 0.1 hour 42.4 g. of tris(2-chloroethyl) phosphite at 27° to 60° C. The mixture was heated to 85° C. to insure complete reaction, and then subjected to vacuum and concentrated to 190° C./0.2 mm. to give N,N′,N″-tributyl - B,B′,B″ - tris{1-[bis(2-chloroethoxy)phosphinyl]-2-ethylhexyloxy}borazole. The haloalkyl bis(haloalkyl)phosphinite and bis(haloalkyl) haloalkylphosphonites react in the same way as the tris(haloalkyl) phosphites.

*Example 4*

To a mixture consisting of 20.1 g. (0.063 mole) of B,B′,B″-tribromoborazole, 100 ml. of dry benzene, and 38 g. (0.191 mole) of diethyl phenylphosphonite in a 500 ml. flask equipped as in Example 1 was added 11.1 g. (0.191 mole) of propionaldehyde in 5 minutes while controlling the reaction temperature between 35–45° C. by cooling when necessary. The mixture was stirred and heated to 73° C. to insure complete reaction, and then placed under vacuum to remove benzene and by-product ethyl bromide. The product, B,B′,B″-tris[1-(ethoxyphenylphosphinyl)propoxy]borazole was a viscous liquid of the structure:

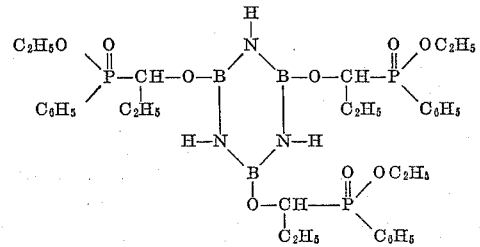

*Example 5*

A 500 ml. flask equipped with a stirrer, thermometer, condenser with drying tube and a solids addition funnel, was charged with 24.9 g. (0.15 mole) of triethyl phosphite and 6.6 g. (0.15 mole) of acetaldehyde in about 75 ml. of benzene. Then 20.6 g. (0.05 mole) of B,B′,B″-trichloro-N,N′,N″-triphenylborazole was added portionwise in 10 minutes. The addition of the borazole was started at 25°, and when the reaction appeared exothermic, the flask was immersed in an ice bath. The remainder of the borazole was added at 10°–20° C. When the addition of the borazole was completed, the mixture was heated to 58° C. to insure complete reaction. After allowing the mixture to cool somewhat, it was placed under vacuum and concentrated to 85°/0.1 mm. The residue, N,N′,N″-triphenyl-B,B′,B″-tris[1-(diethoxyphosphinyl)-ethoxy]borazole, was a clear, amber, viscous liquid.

*Example 6*

This example describes the preparation of the phosphinyl borazole compounds of this invention wherein only one halogen atom attached to the trihaloborazole reactant is replaced. It further shows how the two remaining halogen atoms on the borazole compound are converted to halohydrocarbyloxy radicals by reaction with an epoxide.

A 500 ml. flask equipped with a stirrer, thermometer, condenser with drying tube, and an addition funnel, was charged with 12.7 g. (0.031 mole) of N,N′,N″-triphenyl-B,B′,B″-trichloroborazole in about 75 ml. of dry benzene. This was cooled to 15° C. and then a mixture of 3.9 g. (0.031 mole) of trimethyl phosphite and 1.8 g. (0.031 mole) of propionaldehyde was added dropwise in a few minutes at 14°–17° C. using an icebath for cooling throughout the addition. The mixture was stirred until no further reaction was apparent, heated to 45° C., and then placed under vacuum for a few minutes to remove the methyl chloride by-product. The residue at this point was substantially pure N,N',N''-triphenyl-B,B'-dichloro-B''-[1-(dimethoxyphosphinyl)propoxy]borazole.

After cooling to room temperature, 3.6 g. (0.062 mole) of propylene oxide was added dropwise in a few minutes. An exothermic reaction occurred which required some cooling. The mixture was stirred until no further reaction was evident and then placed under vacuum to remove the benzene, and finally concentrated to 65° C./0.2 mm. The product, N,N',N''-triphenyl-B,B'-bis(2-chloropropoxy) - B''-[1-(dimethoxyphosphinyl)propoxy] borazole, was obtained as a tan, very viscous liquid of the structure.

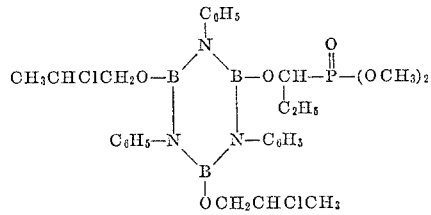

*Example 7*

This example describes the preparation of compounds of this invention wherein two of the halogen atoms on the trihaloborazole reactant are replaced with phosphinylhydrocarbyloxy groups, leaving one unreplaced halogen attached to a boron atom, said unreplaced halogen being available for reaction with an epoxide as in the previous example, if desired.

A mixture of 10.4 g. (0.084 mole) of trimethyl phosphite and 4.9 g. (0.084 mole) of propionaldehyde was added dropwise in 5 minutes to 17.3 g. (0.042 mole) of N,N',N''-triphenyl-B,B',B''-trichloroborazole in 75 ml. of benzene in a 500 ml. flask equipped as in the previous example, while cooling in an ice bath. The mixture was stirred until no further reaction was apparent. The product at this point was N,N',N''-triphenyl-B-chloro-B', B'' - bis[1 - (dimethoxyphosphinyl)propoxy]borazole dissolved in benzene.

Then 5.0 g. (0.042 mole+2.2 g. excess) of propylene oxide was added dropwise in about two minutes using cooling to keep the temperature below 30° C. The mixture was stirred until no further reaction was apparent and then placed under vacuum to remove the benzene solvent. The residue was concentrated to 60° C./0.25 mm. to obtain N,N',N''-triphenyl-B,B'-bis[1-(dimethoxyphosphinyl)propoxy]-B''-(2-chloropropoxy)borazole as a very viscous liquid.

*Example 8*

This example describes the preparation of halohydrocarbyloxyphosphinylhydrocarbyloxy borazole compounds by reacting a trihaloborazole first with an epoxide and when that reaction is completed, reacting the one or two remaining halogens on the boron atoms of the borazole reactant with an aldehyde and a trivalent phosphorus ester to replace the halogens with phosphinylhydrocarbyloxy radicals.

A 500 ml. flask equipped as that used in Example 1 was charged with 23.2 g. (0.066 mole) of N,N',N''-tributyl-B, B',B''-trichloroborazole, and then 3.8 g. (0.066 mole) of propylene oxide was added dropwise in a few minutes, and heated to 80° C. to reflux. After cooling, the mixture was placed under vacuum and heated to 70° C. When no further evidence of reaction was found the so prepared material was mixed with 32.9 g. (0.198 mole) of triethylphosphite and then 21.8 g. (0.198 mole) of p-tolualdehyde was added dropwise in 0.1 hour. The temperature increased gradually to 45° C. The mixture was cooled to 35° C. and stirred at this temperature until no further reaction was apparent. It was then heated to 70° C. to insure complete reaction, placed under vacuum, and distilled to a pot temperature of 135° C./0.75 mm. during which procedure 7.5 g. of unreacted aldehyde and phosphite were removed along with 10.8 g. of ethyl chloride.

The reaction product was a mixture of N,N',N''-tributyl - B - (2-chloropropoxy)-B',B''-bis[α-(diethoxyphosphinyl)-p-methylbenzyloxy]-borazole and N,N',N''-tributyl - B,B',B'' - tris[(diethoxyphosphinyl)-p-methylbenzyloxy]borazole.

*Example 9*

This example describes testing of one of the presently provided compounds for use as a preignition-inhibiting agent in a leaded fuel. It has been established that there is a close relationship between the quantity of a material required to suppress glow and the effectiveness of the same material for reducing preignition of a leaded fuel in gasoline engines; accordingly, testing of the present compound was conducted by a glow test method wherein the following procedure was employed.

Test blends were prepared by blending 5 ml. of a fuel consisting of a high boiling (380°–420° F.) hydrocarbon fraction containing approximately 130 mg. of lead based on the quantity of commercial tetraethyllead-halohydrocarbon additive (hereinafter referred to as TEL) which had been incorporated therein and 1 ml. of an SAE 30 lubricating oil with (1) no glow prevention additive (control) or (2) a graduated precisely weighed quantity of the phosphinyl hydrocarbyloxy borazole compound to be tested. Two milliliters of each test blend was then dropped at a constant rate (1.5±0.1 ml./15 minutes), during a 15–17 minute period, onto a reagent grade decolorizing carbon contained in a crucible maintained in a furnace at a temperature which was high enough to keep the bottom of the crucible at about 1000° F. By using test blends containing progressively lower quantities of the test compound, there was determined the minimum concentration of the test compound at which no glowing of the carbon was evidenced either during the dropping period or after all of the test sample had been added. Under these conditions, the "control" sample, i.e., the one which contained all of the constituents of the test blend except the glow preventive additive, caused the carbon to glow throughout addition thereof, and after addition had been completed. On the other hand, no glow was observed when there was present in the test blend the minimum concentration of 0.0744 g. of N,N', N'' - tributyl - B,B',B'' - tris[1-(diethoxyphosphinyl)propoxy]-borazole.

Instead of the phosphinyl borazole compounds shown above, there may be used, for the purpose of effectively inhibiting preignition of leaded fuels, any of the gasoline-soluble compounds provided by the present invention, and data on the above compound being supplied merely by way of illustrating the valuable properties of those of the compounds of the series which are prepared from relatively readily available raw materials. While, as will be obvious to those skilled in the art, the compound to be useful must be present in the gasoline in soluble form, it will also be realized that since the additive is employed in only very low concentrations, gasoline solubility at the useful concentrations is possessed by the great preponderance of the presently prepared compounds. Whether the phosphinyl hydrocarbyloxy borazole compound is soluble in the gasoline at a concentration which is within the range of, say, from 0.01 to 2.0 volume per volume of organolead compound present in the gasoline can be readily ascertained by routine experimentation.

Inasmuch as the crude reaction mixture obtained by the present process comprises an aliphatic halohydrocarbon as byproduct, the latter obviously can serve conveniently as the lead scavenger in leaded gasoline fuels containing the presently prepared phosphinylhydrocarbyloxy borazole compounds.

Leaded gasoline containing the presently prepared compounds are compatible with other additives customarily used in the art, e.g., rust inhibitors, stabilizers or antioxidants, dyes, etc. Obviously, many variations can be made without departing from the spirit of the invention.

We claim:

1. Compounds of the formula

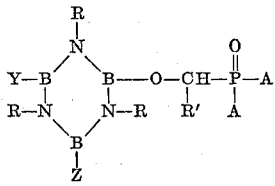

where R is selected from the group consisting of hydrogen, and alkyl and aryl groups having from 1 to 10 carbon atoms, R' is selected from the group consisting of hydrogen, and hydrocarbyl radicals of from 1 to 12 carbon atoms, A is selected from the group consisting of hydrocarbyl, hydrocarbyloxy, halohydrocarbyl, and halohydrocarbyloxy radicals which are free from aliphatic unsaturation and have from 1 to 12 carbons, and Y and Z are each selected from the group consisting of bromine, chlorine, halohydrocarbyloxy radicals having from 2 to 12 carbons, and the

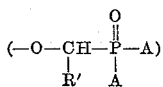

radical.

2. Compounds according to claim 1 in which Y is chlorine and Z is

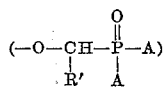

3. Compounds of the formula

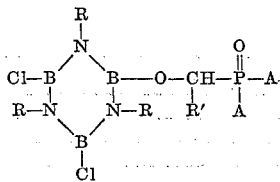

wherein R is selected from the group consisting of hydrogen, aryl, and alkyl radicals having from 1 to 10 carbon atoms, R' is selected from the group consisting of hydrogen and hydrocarbyl radicals of from 1 to 12 carbons, each A is selected from the group consisting of hydrocarbyl, hydrocarbyloxy, halohydrocarbyl, and halohydrocarbyloxy radicals which are free from aliphatic unsaturation and have from 1 to 12 carbon atoms.

4. Compounds of the formula

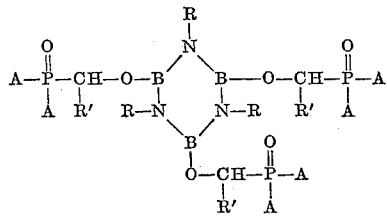

wherein R is selected from the group consisting of hydrogen, aryl, and alkyl radicals having 1 to 10 carbon atoms, R' is selected from the group consisting of hydrogen and hydrocarbyl radicals of from 1 to 12 carbon atoms, and each A is selected from the group consisting of hydrocarbyl, hydrocarbyloxy, halohydrocarbyl, and halohydrocarbyloxy radicals which are free from aliphatic unsaturation and have from 1 to 12 carbon atoms.

5. N,N',N''-tributyl - B,B',B'' - tris[1-(diethoxyphosphinyl)propoxy]borazole.

6. N,N',N''-tributyl - B,B',B'' - tris[1-(dihexyloxyphosphinyl)propoxy]borazole.

7. N,N',N''-tributyl - B,B',B'' - tris{1-[bis(2-chloroethoxy)phosphinyl]-2-ethylhexyloxy}borazole.

8. B,B',B'' - tris[1-(ethoxyphenylphosphinyl)propoxy]borazole.

9. N,N',N''-triphenyl - B,B',B'' - tris[1-(diethoxyphosphinyl)ethoxy]borazole.

10. N,N',N''-triphenyl - B - [1-(dimethoxyphosphinyl)propoxy]-B',B''-bis(2-chloropropoxy)borazole.

11. N,N',N''-triphenyl - B,B' - bis[1-(dimethoxyphosphinyl)propoxy]-B''-(2-chloropropoxy)borazole.

12. The method which comprises contacting a compound of the formula

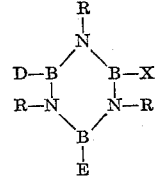

wherein R is a member selected from the group consisting of hydrogen, and aryl and alkyl radicals having from 1 to 10 carbon atoms, X is a halogen selected from the group consisting of bromine and chlorine, D and E are each selected from the group consisting of X, and halohydrocarbyloxy radicals having from 2 to 12 carbon atoms, with an aldehyde of the formula R'CHO wherein R' is a member selected from the group consisting of hydrogen, and hydrocarbyl radicals having from 1 to 12 carbon atoms and a trivalent phosphorus compound of the formula

wherein T is a member selected from the group consisting of alkyl and haloalkyl radicals having from 1 to 12 carbon atoms, and each A is selected from the group consisting of hydrocarbyl, hydrocarbyloxy, halohydrocarbyl, and halohydrocarbyloxy radicals which are free from aliphatic unsaturation and have from 1 to 12 carbon atoms, and recovering from the resulting reaction a compound of the formula

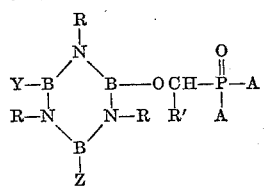

wherein R, R', and A are as defined above, Y and Z are

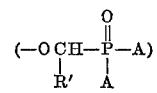

only when D and E respectively were halogens.

13. The method according to claim 12 in which D and E are each chlorine.

14. The method according to claim 12 in which D is

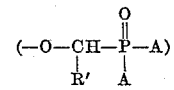

and E is chlorine.

15. The method which comprises contacting a compound having the formula

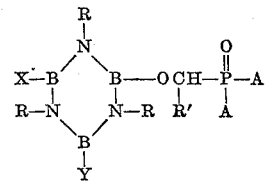

wherein R is selected from the group consisting of hydrogen, and aryl and alkyl radicals having from 1 to 10 carbon atoms, R' is selected from the group consisting of hydrogen and hydrocarbyl radicals having from 1 to 12 carbon atoms, each A is selected from the group consisting of hydrocarbyl, hydrocarbyloxy, halohydrocarbyl, and halohydrocarbyloxy radicals which are free from aliphatic unsaturation and have from 1 to 12 carbon atoms and X is selected from the group consisting of bromine and chlorine and Y is selected from the group consisting of bromine, chlorine, and

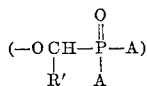

wherein R', and A are as defined above, with an epoxy compound having from 2 to 12 carbon atoms, and recovering from the resulting reaction a compound having the formula

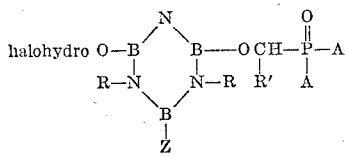

wherein R, R', and A are as defined above, halohydro denotes a halohydrocarbyl radical having from 2 to 12 carbon atoms derived from the epoxy compound used, and Z is selected from the group consisting of a halohydrocarbyloxy radical derived from the epoxy compound used, and

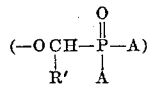

where A and R' are as defined above.

16. The method according to claim 12 in which R is butyl, X is chlorine, R' is alkyl, T is ethyl, each A is ethoxy, and Y and Z are each

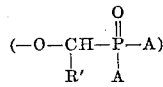

17. The method according to claim 12 in which R is butyl, X is chlorine, R' is alkyl, T is hexyl, each A is hexyloxy, Y and Z are each

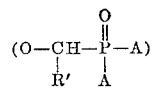

18. The method according to claim 13 in which R is alkyl, X is chlorine, R' is alkyl, T is 2-chloroethyl, each A is 2-chloroethoxy, and Y and Z are each

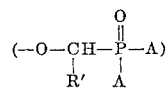

19. The method according to claim 12 in which R is hydrogen, X is bromine, R' is alkyl, T is ethyl, one A is phenyl, the other A is ethoxy, Y and Z are each

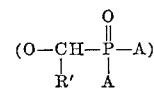

20. The method according to claim 12 in which R is phenyl, X is chlorine, R' is alkyl, T is ethyl, A is ethoxy, and Y and Z are each

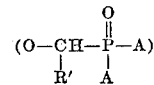

References Cited in the file of this patent

UNITED STATES PATENTS

| | | |
|---|---|---|
| 2,833,635 | Hill et al. | May 6, 1958 |
| 2,841,604 | Toy et al. | July 1, 1958 |
| 2,843,617 | Kaufman | July 15, 1958 |
| 2,897,071 | Gilbert | July 28, 1959 |